(12) United States Patent
Delzenne et al.

(10) Patent No.: US 12,107,488 B2
(45) Date of Patent: Oct. 1, 2024

(54) ELECTRICAL CONVERTER AND METHOD FOR OPERATING AN ELECTRICAL CONVERTER

(71) Applicant: Siemens Energy Global GmbH & Co. KG, Munich (DE)

(72) Inventors: Maxime Delzenne, Erfurt (DE); Guenter Ebner, Henfenfeld (DE)

(73) Assignee: Siemens Energy Global GmbH & Co. KG, Munich (DE)

(*) Notice: Subject to any disclaimer, the term of this patent is extended or adjusted under 35 U.S.C. 154(b) by 218 days.

(21) Appl. No.: 17/616,801

(22) PCT Filed: Jun. 6, 2019

(86) PCT No.: PCT/EP2019/064860
§ 371 (c)(1),
(2) Date: Dec. 6, 2021

(87) PCT Pub. No.: WO2020/244768
PCT Pub. Date: Dec. 10, 2020

(65) Prior Publication Data
US 2022/0311352 A1    Sep. 29, 2022

(51) Int. Cl.
*H02M 1/32*    (2007.01)
*H02M 1/00*    (2007.01)
*H02M 7/483*   (2007.01)

(52) U.S. Cl.
CPC ......... *H02M 1/327* (2021.05); *H02M 1/0009* (2021.05); *H02M 7/4835* (2021.05)

(58) Field of Classification Search
CPC ...... H02M 1/32; H02M 1/327; H02M 7/4835; H02M 1/0009
See application file for complete search history.

(56) References Cited

U.S. PATENT DOCUMENTS 10,790,764 B2 *   9/2020  Adachi ............... H02M 7/4835
2010/0045103 A1 * 2/2010  Mitsutani ............... H02M 1/32
                                                  307/9.1

(Continued)

FOREIGN PATENT DOCUMENTS

CN    104934989 A    9/2015
CN    107733274 A    2/2018

(Continued)

OTHER PUBLICATIONS

Grinberg R et al.; "Study of overcurrent protection for modular multilevel converter"; 2014 IEEE Energy Conversion Congress and Exposition (ECCE); pp. 3401-3407; XP032680626; DOI: 10.1109/ECCE.2014.6953862; 2014.

(Continued)

*Primary Examiner* — Gustavo A Rosario-Benitez
(74) *Attorney, Agent, or Firm* — Laurence A. Greenberg; Werner H. Stemer; Ralph E. Locher (57) ABSTRACT

An electrical converter has an alternating-voltage side with at least two alternating-voltage terminals and a direct-voltage side. At least two series connections connected in parallel and each forming a converter arm of the converter assigned to one of the alternating-voltage terminals. Circular currents can flow between the series connections. According (Continued)

to the method, a load value describing the thermal load of the converter is calculated based on: an active power current value that indicates the active power current component of a phase current flowing across one of the alternating-voltage terminals; a reactive power current value that indicates the reactive power current component of the phase current flowing across the alternating-voltage terminal; and a circular current value that indicates the magnitude of the circular current(s) flowing between the series connections. The converter is controlled while also taking into account this load value.

13 Claims, 3 Drawing Sheets

(56) References Cited

U.S. PATENT DOCUMENTS

| | | | | |
|---|---|---|---|---|
| 2012/0050053 | A1* | 3/2012 | Kim | H02P 9/102 |
| | | | | 713/320 |
| 2015/0155795 | A1* | 6/2015 | Hirsch | H02M 7/48 |
| | | | | 318/400.26 |
| 2016/0226480 | A1 | 8/2016 | Marquardt | |
| 2018/0358840 | A1* | 12/2018 | Gu | H02M 7/217 |
| 2019/0081551 | A1* | 3/2019 | Hu | H02J 3/18 |
| 2019/0273448 | A1* | 9/2019 | Gu | H03K 17/145 |
| 2020/0099286 | A1* | 3/2020 | Maeda | H02M 3/156 |
| 2021/0328537 | A1* | 10/2021 | Iwaji | B60L 3/00 |

FOREIGN PATENT DOCUMENTS

| | | |
|---|---|---|
| JP | 2018196237 A | 12/2018 |
| WO | WO 2015036149 A1 | 3/2015 |
| WO | WO 2018230327 A1 | 12/2018 |

OTHER PUBLICATIONS

Bakhshizadeh Mohammad Kazem et al.; "Indirect thermal control for improved reliability of Modular Multilevel Converter by utilizing circulating current"; 2015 IEEE Applied Power Electronics Conference and Exposition (APEC); pp. 2167-2173; XP032775226; DOI: 10.1109/APEC.2015.7104649; 2015.

Rocha Anderson Vagner et al.: "Thermal Stress and High Temperature Effects on Power Devices in a Fault-Resilient NPC IGCT-Based Converter"; IEEE Transactions on Power Electronics, Institute of Electrical and Electronics Engineers; vol. 31; No. 4; pp. 2800-2807; XP011592307; ISSN: 0885-8993; DOI: 10.1109/TPEL.2015.2452262; 2015.

Marquardt R: "Modular Multilevel Converter: An universal concept for HVDC-Networks and extended DC-Bus-applications", The 2010 International Power Electronics Conference, ISBN 978-1-4244-5393-1, pp. 502-507; 2010.

* cited by examiner

ELECTRICAL CONVERTER AND METHOD FOR OPERATING AN ELECTRICAL CONVERTER

FIELD AND BACKGROUND OF THE INVENTION

The invention relates to converters and to methods for operating same.

The laid-open document "Modular Multilevel Converter: An universal concept for HVDC-Networks and extended DC-Bus-Applications" (R. Marquardt, 2010 International Power Electronics Conference, pages 502 to 507, 978-1-4244-5393-1/10, 2010, IEEE) discloses an electrical converter in the form of a multilevel converter that has an at least two-phase AC voltage side having at least two AC voltage connections, a DC voltage side and at least two parallel-connected series circuits, wherein each of the series circuits in each case forms a converter arm of the converter and is assigned to one of the AC voltage connections on the AC voltage side of the converter.

A multilevel converter having another type of submodules is known from international laid-open document WO 2015/036149 A1.

SUMMARY OF THE INVENTION

The invention is based on the object of specifying a method for operating a converter that helps to avoid thermal overloading or overheating of the converter in a simple manner.

This object is achieved according to the invention by way of a method having the features as claimed. Advantageous embodiments of the method according to the invention are specified in the dependent claims.

Provision is accordingly made, according to the invention, for a loading value describing the thermal loading of the converter to be calculated on the basis of at least three current values, specifically an active power current value that indicates the active power current component of a phase current flowing through one of the AC voltage connections, a reactive power current value that indicates the reactive power current component of the phase current flowing through the abovementioned AC voltage connection, and a circuit current value that indicates the magnitude of the one or more circuit currents flowing between the series circuits, and the converter is controlled at least also taking into consideration this loading value.

One key advantage of the method according to the invention is based on ascertaining the loading value, this being able to be performed in a very simple manner, quickly and with little computational effort on the basis of the variables and measured values applied according to the invention, but still delivering very reliable statements about the actual thermal loading of the converter. Applying the loading value makes it possible to control the converter in a very efficient manner with regard to thermal aspects.

The circuit current value is preferably ascertained by ascertaining, for each of the series circuits, in each case the circuit current flowing there, that is to say series circuit-related circuit current, by determining the greatest series circuit-related circuit current in terms of absolute value, and by considering the absolute value or the amplitude of this greatest series circuit-related circuit current as the circuit current value.

The series circuit-related circuit currents are preferably calculated in accordance with $Iki(t)=(Ipi(t)+Iqi(t))/2+Idc(t)/n-Iai(t)$ wherein $Iki(t)$ denotes the series circuit-related circuit current, dependent on time t, in the ith series circuit or the ith converter arm, $Ipi(t)$ denotes the active power current, dependent on time t, flowing through the AC voltage connection connected to the ith series circuit or to the ith converter arm, $Iqi(t)$ denotes the reactive power current, dependent on time t, flowing through the AC voltage connection connected to the ith series circuit or to the ith converter arm, $Idc(t)$ denotes the DC current dependent on time t and flowing on the DC voltage side, $Iai(t)$ denotes the arm current, dependent on time t, flowing between the positive DC voltage connection of the DC voltage side and the AC voltage connection connected to the ith converter arm, and n denotes the number of series circuits or converter arms.

If the arm current $Iai(t)$, dependent on time t, is measured between the AC voltage connection connected to the ith converter arm and the negative DC voltage connection of the DC voltage side, then the series circuit-related circuit currents are preferably calculated in accordance with $Iki(t)=-(Ipi(t)+Iqi(t))/2+Idc(t)/n-Iai(t)$ The converter is preferably controlled such that the loading value does not fall below or at least does not exceed a predefined loading limit value.

It is advantageous for the loading value to be ascertained in accordance with $$Ith = \sqrt{\frac{1}{a}\cdot(Ip^2+Iq^2)+\left(k1\cdot Ip\cdot f\left(\frac{Vconv}{Vdc}\right)+k2\cdot Ik\right)}$$

wherein Ip denotes the abovementioned active power current value and is formed by the absolute value or the amplitude of the active power current component of the phase current flowing through one of the AC voltage connections, Iq denotes the abovementioned reactive power current value and is formed by the absolute value or the amplitude of the reactive power current component of the phase current flowing through the AC voltage connection, Vconv denotes the absolute value or the amplitude of the voltage at the AC voltage connection, Vdc denotes the absolute value or the amplitude of the DC voltage on the DC voltage side, f (Vconv/Vdc) denotes a predefined function of a quotient formed from the absolute value or the amplitude of the voltage at the AC voltage connection and the DC voltage on the DC voltage side, Ik denotes the circuit current value and is formed by the absolute value or the amplitude of the greatest series circuit-related circuit current and a, k1 and k2 are predefined constants.

The loading limit value may advantageously be ascertained by applying an integral relating to the loading value, in particular in accordance with $Ith$ max$=f(\S Ith(t)^2 dt)$ wherein $Ith(t)$ denotes the loading value over time t and f denotes a predefined function of the integral formed via the square of the loading value.

It is also advantageous for the loading limit value to be reduced when the temperature of the converter reaches or exceeds a predefined maximum temperature.

In a first method variant that is considered to be particularly advantageous, provision is made for the control of the converter, in the event that the loading value reaches or exceeds the predefined loading limit value, to initially incorporate the targeted reduction of the active power current.

In the first method variant, it is particularly advantageous for the converter, in the event that the loading value reaches or exceeds the predefined loading limit value, to then or initially be controlled such that the active power current value does not exceed a predefined active power maximum current value, wherein the active power maximum current value is ascertained on the basis of the following conditional equation:

$$Ith\max = \sqrt{\frac{1}{a} \cdot (Ip\max^2 + Iq^2) + \left(k1 \cdot Ip\max \cdot f\left(\frac{Vconv}{Vdc}\right) + k2 \cdot Ik\right)}$$

wherein Ithmax denotes the predefined loading limit value and Ipmax denotes the active power maximum current value.

As an alternative or in addition, the active power maximum current value may be ascertained in accordance with $$Ip\max = \sqrt{\frac{2Ith\max^2 - Iq^2}{1 + 2(k1 \cdot Vconv/Vdc)^2} - \frac{2 \cdot k1 \cdot k2 \cdot |Ik| \cdot (Vconv/Vdc)}{1 + 2(k1 \cdot Vconc/Vdc)^3}}$$

wherein Ithmax denotes the predefined loading limit value and Ipmax denotes the active power maximum current value.

If, in the course of the control Ith, the predefined loading limit value Ithmax is still reached or exceeded even though the active power maximum current value Ipmax, and thus the active power current value Ip, have already been lowered to zero or have reached zero, then the reactive power maximum current value Iqmax, and thus the reactive power current value Iq, is then preferably reduced in accordance with $$Iq\max = \sqrt{2 \cdot Ith\max^2 - 2 \cdot (k2 \cdot Ik)^2}$$

In a second method variant that is considered to be particularly advantageous, provision is made for the control of the converter, in the event that the loading value reaches or exceeds the predefined loading limit value, to initially incorporate the targeted reduction of the active power current.

In the second method variant, it is particularly advantageous for the converter to be controlled or to initially be controlled such that the reactive power current value falls below or at least does not exceed a reactive power maximum current value dependent on the loading value, wherein the reactive power maximum current value is ascertained on the basis of the following conditional equation:

$$Ith\max = \sqrt{\frac{1}{a} \cdot (Ip^2 + Iq\max^2) + \left(k1 \cdot Ip \cdot f\left(\frac{Vconv}{Vdc}\right) + k2 \cdot Ik\right)}$$

wherein Ithmax denotes the predefined loading limit value and Iqmax denotes the reactive power maximum current value.

As an alternative or in addition, the reactive power maximum current value may be ascertained in accordance with $$Iq\max = \sqrt{2 \cdot Ith\max^2 - Ip^2 - 2 \cdot \left(k1 \cdot Ip \cdot \frac{Vconv}{Vdc} + k2 \cdot Ik\right)^2}$$

wherein Ithmax denotes the predefined loading limit value and Iqmax denotes the reactive power maximum current value.

If, in the course of the control Ith, the predefined loading limit value Ithmax is still reached or exceeded even though the reactive power maximum current value Iqmax, and thus the reactive power current value Iq, have already been lowered to zero or have reached zero, then the active power maximum current value Ipmax, and thus the active power current value Ip, is then preferably reduced in accordance with $$Ip\max = \sqrt{\frac{2Ith\max^2}{1 + 2(k1 \cdot Vconv/Vdc)^2} - \frac{2 \cdot k1 \cdot k2 \cdot |Ik| \cdot (Vconv/Vdc)}{1 + 2(k1 \cdot Vconc/Vdc)^2}}$$

The invention furthermore relates to an electrical converter that has an at least two-phase AC voltage side having at least two AC voltage connections, a DC voltage side and at least two parallel-connected series circuits, wherein each of the series circuits in each case forms a converter arm of the converter and is assigned to one of the AC voltage connections on the AC voltage side of the converter and wherein one or more circuit currents are able to flow between the at least two parallel-connected series circuits. Such a converter is known from the abovementioned laid-open document "Modular Multilevel Converter: An universal concept for HVDC-Networks and extended DC-Bus-Applications" (R. Marquardt, 2010 International Power Electronics Conference, pages 502 to 507, 978-1-4244-5393-1/10, 2010 IEEE).

According to the invention, provision is made for the converter to have a control device that calculates a loading value describing the thermal loading of the converter on the basis of at least three current values, specifically an active power current value that indicates the active power current component of a phase current flowing through one of the AC voltage connections, a reactive power current value that indicates the reactive power current component of the phase current flowing through the abovementioned AC voltage connection, and a circuit current value that indicates the magnitude of the one or more circuit currents flowing between the series circuits, and the control device controls the converter at least also taking into consideration this loading value.

BRIEF DESCRIPTION OF THE FIGURES

With regard to the advantages of the converter according to the invention and with regard to advantageous embodiments of the converter according to the invention, reference is made to the above explanations in connection with the method according to the invention.

The invention is explained in more detail below with reference to exemplary embodiments; in the figures, by way of example.

DETAILED DESCRIPTION OF THE INVENTION

For the sake of clarity, the same reference signs are always used for identical or comparable components in the figures.

Figure 1:
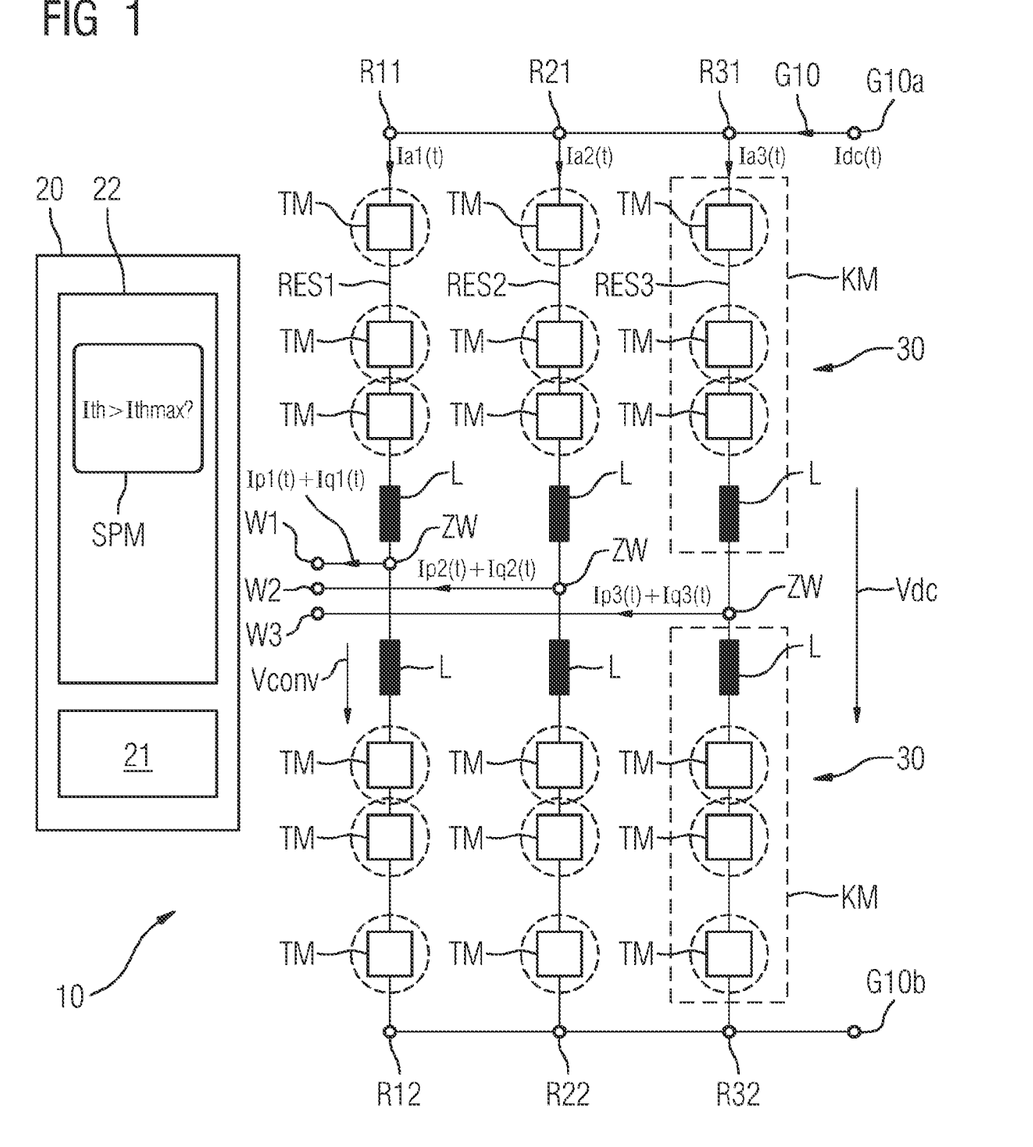
FIG. 1 shows an exemplary embodiment of a converter according to the invention.

FIG. 1 shows an exemplary embodiment of a three-phase modular converter 10, the operating mode of which is defined by a control device 20.

The converter 10 may be any converter, for example a multilevel converter, regardless of the use thereof; it may thus for example be a converter in the field of high-voltage DC technology (HVDC), the field of wind turbines or the field of railway technology.

The converter 10 comprises AC voltage connections W1, W2 and W3 for feeding in or for drawing AC current in the form of phase currents, which each comprise or may comprise an active power current Ip1(t), Ip2(t) and Ip3(t) and a reactive power current Iq1(t), Iq2 (t) and Iq3(t).

The converter 10 is furthermore equipped with a DC voltage side G10 that comprises two DC voltage connections G10a and G10b, via which DC current Idc is able to be fed in or drawn.

The converter 10 according to FIG. 1 has three parallel-connected series circuits RES1, RES2 and RES3, the external connections R11, R21 and R31 of which are connected to the DC voltage connection G10a. The external connections R12, R22 and R32 are connected to the DC voltage connection G10b of the DC voltage side G10. In other words, the external connections of the three series circuits RES1, RES2 and RES3 thus form the DC voltage side G10 of the converter 10.

In the exemplary embodiment according to FIG. 1, each of the three series circuits RES1, RES2 and RES3 is formed in each case by two converter modules KM, which each consist of three or more series-connected submodules TM and an inductor L. An intermediate connection ZW is located between in each case two converter modules KM— here in each case between two inductors L—and lies, in terms of potential, between the three submodules at the top in FIG. 1 and the three submodules at the bottom in FIG. 1 and forms one of the three AC voltage connections W1, W2 and W3 of the converter 10. The submodules TM are actuated by the control device 20.

Figure 2:
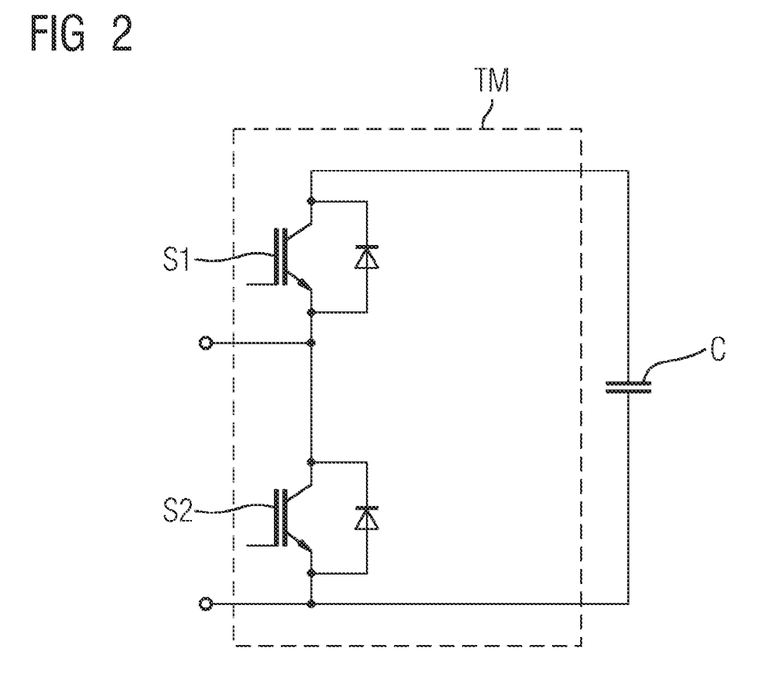
FIG. 2 shows a first exemplary embodiment of a submodule suitable for the converter according to FIG. 1.
Figure 3:
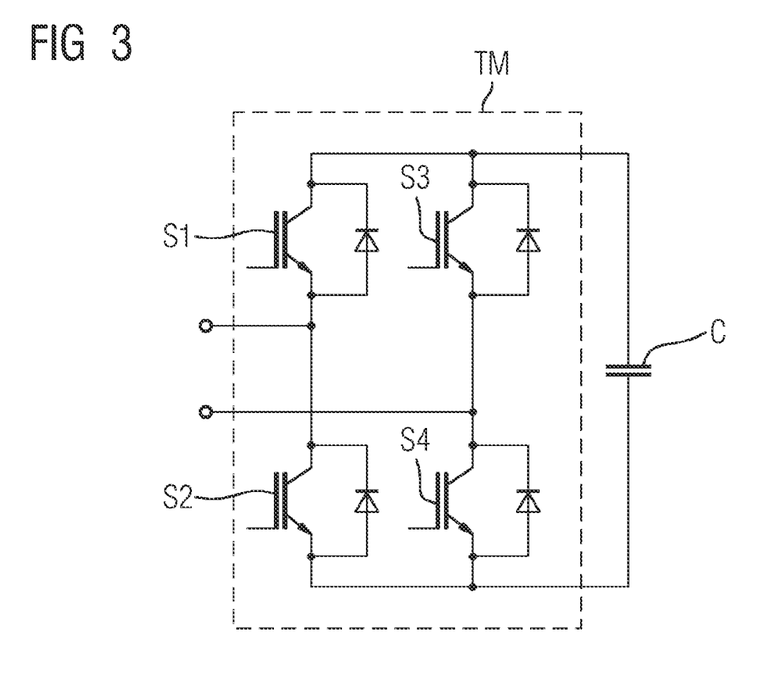
FIG. 3 shows a second exemplary embodiment of a submodule suitable for the converter according to FIG. 1.

The submodules TM may be half-bridge modules, as shown in FIG. 2, or full-bridge modules, as shown in FIG. 3.

FIG. 2 shows one exemplary embodiment of a half-bridge module that is able to be used as one of the submodules TM according to FIG. 1. The submodule TM comprises two switches S1 and S2 that are each formed by a transistor and a parallel-connected freewheeling diode, and a capacitor C.

FIG. 3 shows one exemplary embodiment of a full-bridge module that is able to be used as one of the submodules TM according to FIG. 1. The submodule TM comprises four switches S1 to S4 that are each formed by a transistor and a parallel-connected freewheeling diode, and a capacitor C.

The control device 20 according to FIG. 1 is keen to avoid thermal overloading of the converter 10. To this end, the control device 20 forms a loading value Ith describing the thermal loading of the converter 10 and which it calculates on the basis of at least three current values.

An explanation is given below in the context of exemplary embodiments as to how the loading value Ith is able to be ascertained and used further. In this case, by way of example, one three-phase converter 10 as shown in FIG. 1 is assumed; the following explanations apply accordingly to two or more three-phase converters 10.

The control device 20 of the converter 10, in order to perform the method steps, in particular computing steps, described below, comprises a computing device 21 and a memory 22. The memory 22 stores a control program module SPM that, when executed by the computing device 21, prompts the running of the method steps and computing steps described in detail below; the measured values on the basis of which the method steps and computing steps are performed come from sensors that, for the sake of clarity, are not shown in any more detail and are connected to the control device 20.

The control device 20 first of all ascertains the series circuit-related circuit currents flowing in the converter 10, for example in accordance with $$Ik1(t)=(Ip1(t)+Iq1(t))/2+Idc(t)/3-Ia1(t)$$

$$Ik2(t)=(Ip2(t)+Iq2(t))/2+Idc(t)/3-Ia2(t)$$

$$Ik3(t)=(Ip3(t)+Iq3(t))/2+Idc(t)/3-Ia3(t)$$

wherein $Ik1(t)$ denotes the series circuit-related circuit current, dependent on time t, in the first series circuit RES1, $Ik2(t)$ denotes the series circuit-related circuit current, dependent on time t, in the second series circuit RES2 and $Ik3(t)$ denotes the series circuit-related circuit current, dependent on time t, in the third series circuit RES3. $Ip1(t)$, $Ip2(t)$ and $Ip3(t)$ denote the active power currents, dependent on time t, flowing through the AC voltage connections W1, W2 and W3. $Iq1(t)$, $Iq2(t)$ and $Iq3(t)$ denote the reactive power currents, dependent on time t, flowing through the AC voltage connections W1, W2 and W3. Idc(t) denotes the DC current dependent on time t and flowing on the DC voltage side G10. $Ia1(t)$, $Ia2(t)$ and $Ia3(t)$ denote the arm currents, dependent on time t, flowing between the positive DC voltage connection G10a of the DC voltage side G10 and the AC voltage connections W1, W2 and W3.

If the arm currents are each measured between the AC voltage connections W1, W2 or W3 and the negative DC voltage connection G10b of the DC voltage side, then the series circuit-related circuit currents are preferably calculated as follows:

$$Ik1(t)=-(Ip1(t)+Iq1(t))/2+Idc(t)/3-Ia1(t)$$

$$Ik2(t)=-(Ip2(t)+Iq2(t))/2+Idc(t)/3-Ia2(t)$$

$$Ik3(t)=-(Ip3(t)+Iq3(t))/2+Idc(t)/3-Ia3(t)$$

From the series circuit-related circuit currents $Ik1(t)$, $Ik2(t)$ and $Ik3(t)$, the control device 20 selects the greatest series circuit-related circuit current in terms of absolute value and then considers the absolute value or the amplitude of this greatest series circuit-related circuit current as what is called the circuit current value Ik for the further control.

On the basis of the circuit current value Ik, the control device 20 then ascertains the loading value Ith, preferably in accordance with $$Ith = \sqrt{\frac{1}{a} \cdot (Ip^2 + Iq^2) + \left(k1 \cdot Ip \cdot f\left(\frac{Vconv}{Vdc}\right) + k2 \cdot Ik\right)}$$

wherein Ip denotes an active power current value that is formed by the absolute value or the amplitude of one of the active power currents Ip1(t), Ip2(t) or Ip3(t). The phase currents flowing through the AC voltage connections W1, W2 and W3 will generally be equal or very similar in terms of absolute value or amplitude, such that each of the phase currents in the AC voltage connections W1, W2 or W3 may be selected to form the active power current value Ip, for example the phase current through the AC voltage connection W1.

If the phase currents at the AC voltage connections W1, W2 or W3 differ beyond a predefined extent, then the absolute values or amplitudes of the active power currents Ip1(t), Ip2(t) and Ip3(t) may also be averaged and the average value may be used further as the active power current value Ip.

Iq in the above formula denotes a reactive power current value that is formed by the absolute value or the amplitude of the reactive power current component of that phase current that was also used to determine the active power current value. If the active power current value was formed by averaging the absolute values or amplitudes of the active power current components Ip1(t), Ip2(t) and Ip3(t), then the reactive power current value is preferably likewise formed by averaging, specifically by averaging the absolute values or amplitudes of the reactive power current components Iq1(t), Iq2(t) and Iq3(t). Vconv in the last-mentioned formula denotes the absolute value or the amplitude of the voltage at the selected AC voltage connection W1, W2 or W3 or an average value formed therefrom; Vdc denotes the absolute value or the amplitude of the DC voltage on the DC voltage side G10.

$$f\left(\frac{Vconv}{Vdc}\right)$$

in the last-mentioned formula denotes a predefined function of a quotient formed from the absolute value or the amplitude of the voltage at the AC voltage connection W1, W2 or W3 and the DC voltage Udc on the DC voltage side G30.

Ik in the last-mentioned formula denotes the circuit current value that is formed by the absolute value or the amplitude of the greatest series circuit-related circuit current, as already explained above.

The characters a, k1 and k2 in the formula are predefined constants. The constant a is preferably equal to 2.

The constants k1 and k2 are preferably ascertained on the basis of test measurements, in which the loading value Ith is compared with the actual thermal loading of the converter 10 (for example on the basis of temperature measurements) and the comparison results thereof deliver suitable values for the constants k1 and k2 for subsequent converter operation.

The function $$f\left(\frac{Vconv}{Vdc}\right)$$

preferably reads:

$$f\left(\frac{Vconv}{Vdc}\right) = \left(\frac{Vconv}{Vdc}\right)$$

Figure 4:
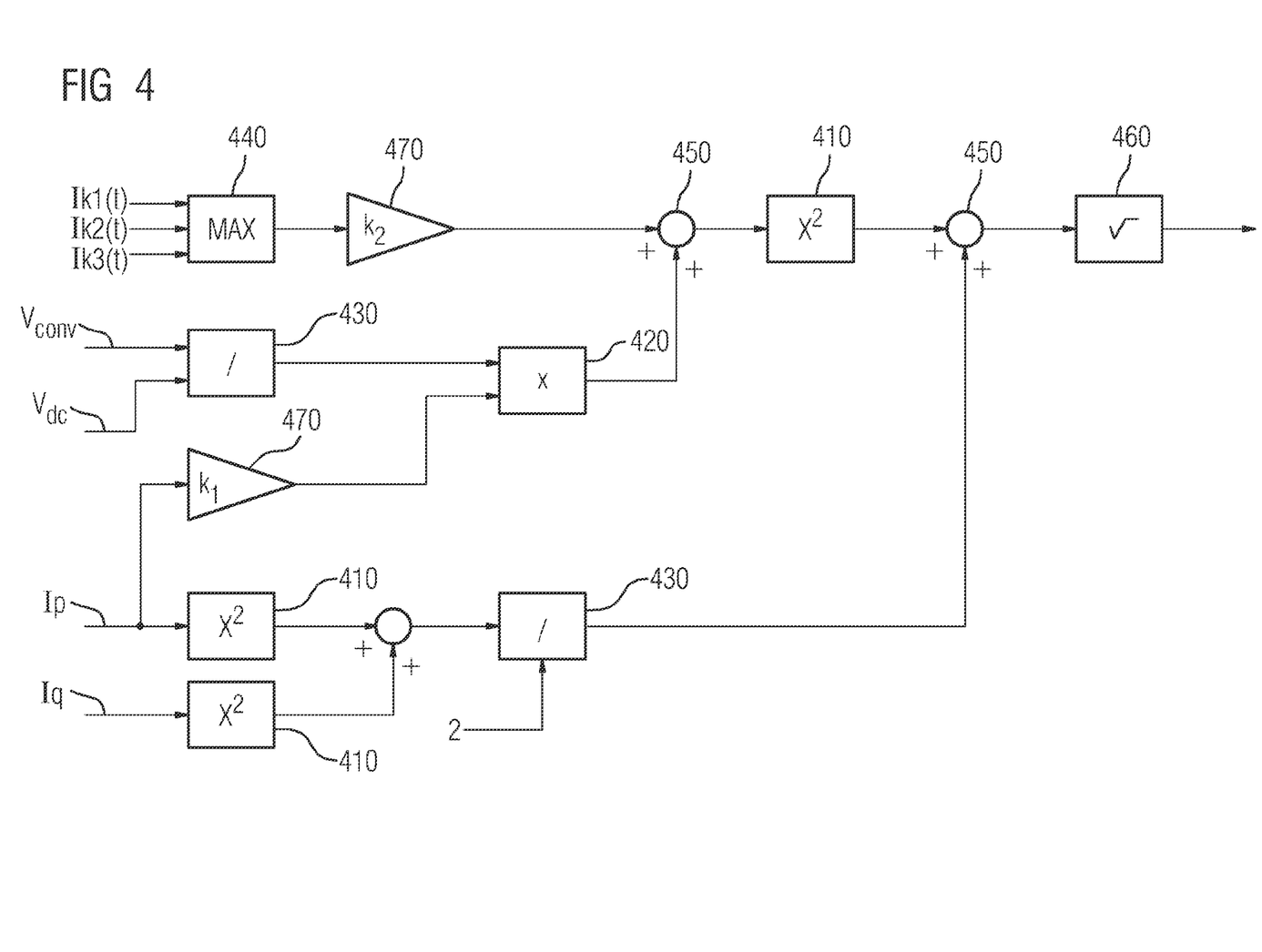
FIG. 4 shows a block diagram of an exemplary arrangement of components by way of which the loading value Ith is able to be calculated.

FIG. 4 shows a block diagram of an arrangement 400 of components by way of which the loading value Ith is able to be calculated as described. The arrangement 400 comprises three squarers 410, a multiplier 420, two dividers 430, a maximum value former 440, two adders 450, a square root former 460 and two scalers 470 (multiplier with a constant k1 or k2).

If the loading value Ith reaches or exceeds a predefined loading limit value Ithmax, then, in preferred control or regulation variants, there may be a targeted reduction of the active power current or of the reactive power current.

If, in the event that the loading value Ith reaches or exceeds the predefined loading limit value Ithmax, a targeted reduction of the active power current is initially intended to take place, then the control device 20, preferably through appropriate actuation of the submodules TM, will ensure that the active power current value Ip does not exceed a predefined active power maximum current value Ipmax. This active power maximum current value Ipmax is preferably ascertained numerically on the basis of the following conditional equation:

$$Ith\ \max = \sqrt{\frac{1}{a} \cdot (Ip\max^2 + Iq^2) + \left(k1 \cdot Ip\max \cdot f\left(\frac{Vconv}{Vdc}\right) + k2 \cdot Ik\right)}$$

As an alternative, the control device 20 may determine the active power maximum current value by working out the following equation:

$$Ip\max = \sqrt{\frac{2Ith\max^2 - Iq^2}{1 + 2(k1 \cdot Vconv/Vdc)^2}} - \frac{2 \cdot k1 \cdot k2 \cdot |Ik| \cdot (Vconv/Vdc)}{1 + 2(k1 \cdot Vconc/Vdc)^2}$$

If, in the course of the control Ith, the predefined loading limit value Ithmax is still reached or exceeded even though the active power maximum current value Ipmax, and thus the active power current value Ip, have already been lowered to zero and have reached zero, then the reactive power maximum current value Iqmax, and thus the reactive power current value Iq, is then preferably reduced in accordance with $$Iq\ \max = \sqrt{2 \cdot Ith\max^2 - 2 \cdot (k2 \cdot Ik)^2}$$

If, in the event that the loading value Ith reaches or exceeds the predefined loading limit value Ithmax, a targeted reduction of the reactive power current is initially intended to take place, then the control device 20, preferably through appropriate actuation of the submodules TM, will ensure that the reactive power current value Iq falls below or at least does not exceed a reactive power maximum current value Iqmax dependent on the loading limit value Ithmax. This reactive power maximum current value Iqmax is preferably ascertained on the basis of the following conditional equation:

$$Ith\max = \sqrt{\frac{1}{a} \cdot (Ip^2 + Iq\max^2) + \left(k1 \cdot Ip \cdot f\left(\frac{Vconv}{Vdc}\right) + k2 \cdot Ik\right)}$$

As an alternative, the control device 20 may determine the reactive power maximum current value Iqmax by working out the following equation:

$$Iq\max = \sqrt{2 \cdot Ith\max^2 - Ip^2 - 2 \cdot \left(k1 \cdot Ip \cdot \frac{Vconv}{Vdc} + K2 \cdot Ik\right)^2}$$

If, in the course of the control Ith, the predefined loading limit value Ithmax is still reached or exceeded even though the reactive power maximum current value Iqmax, and thus the reactive power current value Iq, have already been lowered to zero and have reached zero, then the active power maximum current value Ipmax, and thus the active power current value Ip, is then preferably reduced in accordance with $$Ip\max = \sqrt{\frac{2Ith\max^2}{1 + 2(k1 \cdot Vconv/Vdc)^2} - \frac{2 \cdot k1 \cdot k2 \cdot |Ik| \cdot (Vconv/Vdc)}{1 + 2(k1 \cdot Vconc/Vdc)^2}}$$

The abovementioned loading limit value Ithmax is preferably ascertained by applying the temporally changing loading value Ith or is adapted thereto, specifically, particularly preferably, by a function on the basis of an integral. Ithmax is preferably calculated in accordance with:

$$Ith\max = f\left(\int Ith(t)^2 dt\right), \text{ in particular in accordance with}$$

$$Ith\max(t) = f\left(\int_{t-T}^{t} Ith(t)^2 dt\right)$$

wherein Ith(t) denotes the loading value over time t and f denotes a predefined function of the integral formed via the square of the loading value. The integration duration T may be a fixed value that preferably depends on the period duration or the frequency on the AC voltage side of the converter 10.

The function f preferably reads as follows:

$$f(x) = I_1 + (I_2 - I_3) \cdot \max\left(0, \min\left(1, 1 - \frac{1}{K} \cdot (x - I_1^2 T)\right)\right)$$

wherein I1, I2 and k are predefined constants. I1 describes the maximum loading that is permissible for the converter on a sustainable basis; I2 describes the maximum loading that is permissible for the converter on a brief basis. k is homogenous (proportional) to $i^2 t$ and corresponds to the maximum loading I2 during a predefined time interval (for example the integration duration T).

In one simplified variant, the loading limit value Ithmax is calculated in accordance with $$Ith\max(t) = f\left(\int_{t-T}^{t} Ith(t)^2 dt\right) = \int_{t-T}^{t} Ith(t)^2 dt$$

It is also advantageous for the loading limit value Ithmax to be reduced when the temperature of the converter 10 reaches or exceeds a predefined maximum temperature Tmax.

Although the invention has been described and illustrated in more detail through preferred exemplary embodiments, the invention is not restricted by the disclosed examples, and other variations may be derived therefrom by a person skilled in the art without departing from the scope of protection of the invention.

LIST OF REFERENCE SIGNS

- 10 converter
- 20 control device
- 21 computing device
- 22 memory
- 400 arrangement
- 410 squarer
- 420 multiplier
- 430 divider
- 440 maximum value former
- 450 adder
- 460 square root former
- 470 scaler
- a constant
- C capacitor
- G10 DC voltage side
- G10a DC voltage connection
- G10b DC voltage connection
- Ia1 arm current
- Ia2 arm current
- Ia3 arm current
- Idc DC current
- Ik circuit current value
- Ik1 circuit current
- Ik2 circuit current
- Ik3 circuit current
- Ip active power current value
- Ip1(t) active power current
- Ip2(t) active power current
- Ip3(t) active power current
- Ipmax active power maximum current value
- Iq1(t) reactive power current
- Iq2(t) reactive power current
- Iq3(t) reactive power current
- Iqmax reactive power maximum current value
- Ith loading value
- Ithmax loading limit value
- k1 constant
- k2 constant
- KM converter module
- L inductor
- R11 connection
- R12 connection
- R21 connection
- R22 connection
- R31 connection
- R32 connection
- RES1 series circuit
- RES2 series circuit
- RES3 series circuit
- S1 switch
- S2 switch
- S3 switch
- S4 switch
- SPM control program module
- t time
- TM submodule
- Udc DC voltage Vconv absolute value or amplitude of the voltage at the AC voltage connection
Vdc absolute value or amplitude of the DC voltage
W1 AC voltage connection
W2 AC voltage connection
W3 AC voltage connection
ZW intermediate connection

The invention claimed is:

1. A method for operating an electrical converter which has an AC voltage side with at least two phases and a DC voltage side, the method comprising:
   providing the electrical converter with at least two AC voltage connections on the AC voltage side and at least two parallel-connected series circuits, with each of the series circuits forming a respective converter arm of the converter and being assigned to one of the AC voltage connections on the AC voltage side of the converter;
   wherein one or more circuit currents are able to flow between the at least two parallel-connected series circuits;
   calculating a loading value describing a thermal loading of the converter on a basis of at least three current values, namely:
      an active power current value that indicates an active power current component of a phase current flowing through one of the AC voltage connections;
      a reactive power current value that indicates a reactive power current component of the phase current flowing through the one AC voltage connection; and
      a circuit current value that indicates a magnitude of the one or more circuit currents flowing between the series circuits; and
   controlling the converter while taking into consideration the loading value; and
   calculating the series circuit-related circuit currents in accordance with $$Iki(t)=(Ipi(t)+Igi(t))/2+Idc(t)/n-Iai(t)$$

where:
   Iki(t) denotes a series circuit-related circuit current, as a function of time t, in an ith series circuit or an ith converter arm;
   Ipi(t) denotes the active power current, as a function of time t, flowing through the AC voltage connection connected to the ith series circuit or to the ith converter arm;
   Iqi(t) denotes the reactive power current, as a function of time t, flowing through the AC voltage connection connected to the ith series circuit or to the ith converter arm;
   Idc(t) denotes the DC current, as a function of time t, flowing on the DC voltage side;
   Iai(t) denotes an arm current, as a function of time t, flowing between a positive DC voltage connection of the DC voltage side and the AC voltage connection connected to the ith converter arm; and
   n denotes a number of series circuits or converter arms.

2. The method according to claim 1, which comprises ascertaining the circuit current value by ascertaining, for each of the series circuits, the circuit current flowing therein, by determining a greatest series circuit-related circuit current in terms of absolute value and by considering the absolute value (amplitude) of the greatest series circuit-related circuit current as the circuit current value.

3. The method according to claim 1, which comprises controlling the converter to cause the loading value to fall below or to not to exceed a predefined loading limit value.

4. The method according to claim 1, which comprises ascertaining a loading limit value for controlling the converter by applying an integral relating to the loading value, namely:

$$Ith\ max = f(\int Ith(r)^2 dt)$$

wherein Ith (t) denotes the loading value over time t and f denotes a predefined function of the integral formed via the square of the loading value.

5. The method according to claim 4, which comprises reducing the loading limit value when a temperature of the converter reaches or exceeds a predefined maximum temperature.

6. The method according to claim 4, wherein the step of controlling the converter, in an event that the loading value reaches or exceeds the predefined loading limit value, includes a targeted reduction of the active power current.

7. The method according to claim 1, which comprises controlling the converter, in an event that the loading value reaches or exceeds a predefined loading limit value, such that the active power current value does not exceed a predefined active power maximum current value, and ascertaining the active power maximum current value from the following conditional equation:

$$Ith\ max = \sqrt{\frac{1}{a} \cdot (Ip\ max^2 + Iq^2) + \left(k1 \cdot Ip\ max \cdot f\left(\frac{Vconv}{Vdc}\right) + k2 \cdot Ik\right)}$$

wherein:
   Ithmax denotes the predefined loading limit value, Ipmax denotes the active power maximum current value;
   Iq denotes the reactive power current value and is formed by an absolute value of or an amplitude of the reactive power current component of the phase current flowing through the AC voltage connection;
   Vconv denotes an absolute value of or an amplitude of a voltage at the AC voltage connection;
   Vdc denotes an absolute value of or an amplitude of the DC voltage on the DC voltage side;
   Ik denotes the circuit current value and is formed by an absolute value of or an amplitude of a greatest series circuit-related circuit current; and
   a, k1 and k2 are predefined constants.

8. The method according to claim 1, which comprises controlling the converter, in an event that the loading value reaches or exceeds a predefined loading limit value, such that the active power current value does not exceed a predefined active power maximum current value;
   wherein the active power maximum current value is ascertained in accordance with $$Ip\ max = \sqrt{\frac{2Ith\ max^2 - Iq^2}{1 + 2(k1 \cdot Vconv/Vdc)^2}} - \frac{2 \cdot k1 \cdot k2 \cdot |Ik| \cdot (Vconv/Vdc)}{1 + 2(k1 \cdot Vconc/Vdc)^2}$$

wherein:
   Ipmax denotes the active power maximum current value and Ithmax denotes the predefined loading limit value;
   Iq denotes the reactive power current value and is formed by an absolute value of or an amplitude of the reactive power current component of the phase current flowing through the AC voltage connection;
   Vconv denotes an absolute value of or an amplitude of a voltage at the AC voltage connection;

Vdc denotes an absolute value of or an amplitude of the
DC voltage on the DC voltage side;
Ik denotes the circuit current value and is formed by an
absolute value of or an amplitude of a greatest series
circuit-related circuit current; and
a, k1 and k2 are predefined constants.

9. The method according to claim 1, which comprises controlling the converter, in an event that the loading value reaches or exceeds a predefined loading limit value, incorporates a targeted reduction of the reactive power current.

10. The method according to claim 9, which comprises controlling the converter such that the reactive power current value falls below or does not exceed a reactive power maximum current value dependent on the loading value, and ascertaining the reactive power maximum current value from the following conditional equation:

$$Ith\max = \sqrt{\frac{1}{a} \cdot (Ip^2 + Iq\max^2) + \left(k1 \cdot Ip \cdot f\left(\frac{Vconv}{Vdc}\right) + k2 \cdot Ik\right)}$$

wherein:
Ithmax denotes the predefined loading limit value and Iqmax denotes the reactive power maximum current value;
Ip denotes the active power current value and is formed by an absolute value of or an amplitude of the active power current component of the phase current flowing through the AC voltage connection;
Vconv denotes an absolute value of or an amplitude of a voltage at the AC voltage connection;
Vdc denotes an absolute value of or an amplitude of the DC voltage on the DC voltage side;
Ik denotes the circuit current value and is formed by an absolute value of or an amplitude of a greatest series circuit-related circuit current; and
a, k1 and k2 are predefined constants.

11. The method according to claim 9, which comprises controlling the converter, in the event that the loading value reaches or exceeds the predefined loading limit value, such that the reactive power current value does not exceed a predefined reactive power maximum current value, wherein the reactive power maximum current value is ascertained in accordance with $$Iq\max\sqrt{2 \cdot Ith\max^2 - Ip^2 - 2 \cdot \left(k1 \cdot Ip \cdot \frac{Vconv}{Vdc} + k2 \cdot Ik\right)^2}$$

wherein:
Ithmax denotes the predefined loading limit value and Iqmax denotes the reactive power maximum current value;
Ip denotes the active power current value and is formed by an absolute value of or an amplitude of the active power current component of the phase current flowing through the AC voltage connection;
Vconv denotes an absolute value of or an amplitude of a voltage at the AC voltage connection;
Vdc denotes an absolute value of or an amplitude of the DC voltage on the DC voltage side;
Ik denotes the circuit current value and is formed by an absolute value of or an amplitude of a greatest series circuit-related circuit current; and
a, k1 and k2 are predefined constants.

12. A method for operating an electrical converter which has an AC voltage side with at least two phases and a DC voltage side, the method comprising:
providing the electrical converter with at least two AC voltage connections on the AC voltage side and at least two parallel-connected series circuits, with each of the series circuits forming a respective converter arm of the converter and being assigned to one of the AC voltage connections on the AC voltage side of the converter;
wherein one or more circuit currents are able to flow between the at least two parallel-connected series circuits;
calculating a loading value describing a thermal loading of the converter on a basis of at least three current values, namely:
an active power current value that indicates an active power current component of a phase current flowing through one of the AC voltage connections;
a reactive power current value that indicates a reactive power current component of the phase current flowing through the one AC voltage connection; and
a circuit current value that indicates a magnitude of the one or more circuit currents flowing between the series circuits;
controlling the converter while taking into consideration the loading value; and
ascertaining the loading value in accordance with $$Ith = \sqrt{\frac{1}{a} \cdot (Ip^2 + Iq^2) + \left(k1 \cdot Ip \cdot f\left(\frac{Vconv}{Vdc}\right) + k2 \cdot Ik\right)}$$

wherein:
Ip denotes the active power current value and is formed by an absolute value or an amplitude of the active power current component of the phase current flowing through the AC voltage connection;
Iq denotes the reactive power current value and is formed by the absolute value or an amplitude of the reactive power current component of the phase current flowing through the AC voltage connection;
Vconv denotes the absolute value or an amplitude of a voltage at the AC voltage connection;
Vdc denotes the absolute value or an amplitude of the DC voltage on the DC voltage side;

$$f\left(\frac{Vconv}{Vdc}\right)$$

denotes a predefined function of a quotient formed from the absolute value or an amplitude of the voltage at the AC voltage connection and the DC voltage on the DC voltage side;
Ik denotes the circuit current value and is formed by the absolute value or an amplitude of a greatest series circuit-related circuit current; and
a, k1 and k2 are predefined constants.

13. An electrical converter, comprising:
an AC voltage side with at least two-phases and at least two AC voltage connections;
a DC voltage side;
at least two parallel-connected series circuits, each of said series circuits forming a converter arm of the converter and being assigned to a respective one of said AC voltage connections on the AC voltage side of the converter, and wherein one or more circuit currents are able to flow between the at least two parallel-connected series circuits; and a control device configured to calculate a loading value describing a thermal loading of the converter on a basis of at least three current values, namely:

an active power current value that indicates an active power current component of a phase current flowing through one of said AC voltage connections;

a reactive power current value that indicates a reactive power current component of the phase current flowing through said one AC voltage connection; and a circuit current value that indicates a magnitude of the one or more circuit currents flowing between said series circuits; and said control device being configured to control the converter while taking into consideration the loading value, to ascertain a loading limit value for controlling the converter by applying an integral relating to the loading value, namely:

$Ith \max = f(\int Ith(t)^2 dt)$ wherein Ith (t) denotes the loading value over time t and f denotes a predefined function of the integral formed via the square of the loading value, and to reduce the loading limit value for controlling the converter when a temperature of the converter reaches or exceeds a predefined maximum temperature.

* * * * *

UNITED STATES PATENT AND TRADEMARK OFFICE
CERTIFICATE OF CORRECTION

PATENT NO. : 12,107,488 B2
APPLICATION NO. : 17/616801
DATED : October 1, 2024
INVENTOR(S) : Maxime Delzenne et al.

It is certified that error appears in the above-identified patent and that said Letters Patent is hereby corrected as shown below:

In the Claims

Claim 1, Column 11, Lines 30-50 should read as follows:
    a circuit current value that indicates a magnitude of the
        one or more circuit currents flowing between the
        series circuits;
controlling the converter while taking into consideration
    the loading value; and
calculating the series circuit-related circuit currents in
    accordance with
    $I_{ki}(t) = (I_{pi}(t)+I_{qi}(t))/2 + I_{dc}(t)/n - I_{ai}(t)$
where:
$I_{ki}(t)$ denotes a series circuit-related circuit current, as a
    function of time t, in an ith series circuit or an ith
    converter arm;
$I_{pi}(t)$ denotes the active power current, as a function of
    time t, flowing through the AC voltage connection
    connected to the ith series circuit or to the ith converter
    arm;
$I_{qi}(t)$ denotes the reactive power current, as a function of
    time t, flowing through the AC voltage connection
    connected to the ith series circuit or to the ith converter
    arm;

Claim 4, Column 12, Lines 1-9 should read as follows:
4. The method according to claim 1, which comprises
ascertaining a loading limit value for controlling the con-
verter by applying an integral relating to the loading value,
namely:

Signed and Sealed this
    Twenty-fourth Day of December, 2024

Derrick Brent
*Acting Director of the United States Patent and Trademark Office*

$$Ith\,\max = f\left(\int Ith(t)^2 dt\right)$$

wherein *Ith(t)* denotes the loading value over time t and
f denotes a predefined function of the integral formed via the square of the loading value.

Claim 6, Column 12, Lines 14-17 should read as follows:
6. The method according to claim 4, wherein controlling the converter, in an event that the loading value reaches or exceeds the predefined loading limit value, includes a targeted reduction of the active power current.